US006978036B2

(12) United States Patent
Alattar et al.

(10) Patent No.: US 6,978,036 B2
(45) Date of Patent: Dec. 20, 2005

(54) TAMPER-RESISTANT AUTHENTICATION TECHNIQUES FOR IDENTIFICATION DOCUMENTS

(75) Inventors: Adnan M. Alattar, Tigard, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 569 days.

(21) Appl. No.: 10/170,223

(22) Filed: Jun. 10, 2002

(65) Prior Publication Data

US 2003/0031340 A1   Feb. 13, 2003

Related U.S. Application Data

(63) Continuation-in-part of application No. 09/939,298, filed on Aug. 24, 2001, now Pat. No. 6,804,379, which is a continuation of application No. 09/127,502, filed on Jul. 31, 1998, now Pat. No. 6,345,104.

(51) Int. Cl.[7] .............................................. H04K 1/00
(52) U.S. Cl. ...................................... 382/100; 283/74
(58) Field of Search ............................... 382/100, 232; 380/287, 51, 54, 55; 713/176; 358/3.28; 340/5.81, 5.86; 283/72, 74, 75, 85, 113, 901

(56) References Cited

U.S. PATENT DOCUMENTS

| 4,590,366 | A |   | 5/1986  | Rothfjell ...................... 235/494 |
| 5,221,833 | A |   | 6/1993  | Hetch .......................... 235/494 |
| 5,495,581 | A |   | 2/1996  | Tsai ............................ 395/154 |
| 5,505,494 | A |   | 4/1996  | Belluci et al. ................. 283/75 |
| 5,629,770 | A |   | 5/1997  | Brassil et al. ............. 358/261.1 |
| 5,636,292 | A |   | 6/1997  | Rhoads ....................... 382/232 |
| 5,646,997 | A |   | 7/1997  | Barton ........................ 380/23 |
| 5,652,626 | A |   | 7/1997  | Kawakami et al. ......... 348/463 |
| 5,664,018 | A |   | 9/1997  | Leighton ...................... 380/54 |
| 5,668,874 | A | * | 9/1997  | Kristol et al. ................. 380/23 |
| 5,721,788 | A |   | 2/1998  | Powell et al. ............... 382/100 |
| 5,772,250 | A |   | 6/1998  | Gasper ....................... 283/114 |
| 5,841,886 | A |   | 11/1998 | Rhoads ....................... 382/115 |
| 5,951,055 | A |   | 9/1999  | Mowry, Jr. .................. 283/93 |
| 6,024,287 | A |   | 2/2000  | Takai et al. ................. 235/493 |
| 6,076,738 | A |   | 6/2000  | Bloomberg et al. ......... 235/494 |
| 6,081,345 | A |   | 6/2000  | Curry ......................... 358/1.9 |
| 6,104,812 | A |   | 8/2000  | Koltai et al. ................. 380/51 |

(Continued)

FOREIGN PATENT DOCUMENTS

| EP | 650146 A1 | 4/1995 | ............ G07C 9/00 |
| JP | 3-185585 A | 8/1991 | ........... G06K 17/00 |

OTHER PUBLICATIONS

U.S. Appl. No. 09/404,291, filed Sep. 23, 1999, Levy.

(Continued)

Primary Examiner—Andrew W. Johns
(74) Attorney, Agent, or Firm—Digimarc Corporation

(57) ABSTRACT

The present invention provides techniques that are helpful in resolving the authentication of an identification document or banknote. The document or banknote includes a security enhancer. The enhancer can be a graphic or artwork design, or can be realized with line art. In the case of an identification document, the spatial characteristics of the security enhancer are preferably altered in accordance with information contained in the identification document. For example, if the ID document includes a photograph, a hashing algorithm will reduce the photograph to a number. The number is used to set a repeated spacing distance of elements in the security enhancer. The repeated spacing yields an identifiable frequency response that is related to the identification document photograph.

17 Claims, 10 Drawing Sheets

U.S. PATENT DOCUMENTS

| | | | |
|---|---|---|---|
| 6,122,403 A | 9/2000 | Rhoads | 382/233 |
| 6,185,683 B1 | 2/2001 | Ginter et al. | 713/176 |
| 6,243,480 B1 | 6/2001 | Zhao et al. | 382/100 |
| 6,345,104 B1 | 2/2002 | Rhoads | 382/100 |
| 6,614,914 B1 | 9/2003 | Rhoads et al. | 382/100 |
| 6,754,377 B2 | 6/2004 | Rhoads | 382/135 |
| 6,804,379 B2 | 10/2004 | Rhoads | 382/101 |
| 2001/0030759 A1 | 10/2001 | Hayashi et al. | 358/1.9 |
| 2002/0126872 A1 | 9/2002 | Brunk et al. | 382/100 |

OTHER PUBLICATIONS

Brassil et al., "Electronic Marking and Identification Techniques to Discourage Document Copying," IEEE Proc. Infocom'94, Jun. 1994, pp. 1278-1287.

Szepanski, W., "A Signal Theoretic Method for Creating Forgery-Proof Documents for Automatic Verification," Proc. of 1979 Carnahan Conference on Crime Countermeasures, pp. 101-109, May 16, 1979.

* cited by examiner

Spatial Domain

Spatial Domain

Frequency Domain

Spatial Domain

Frequency Domain

TAMPER-RESISTANT AUTHENTICATION TECHNIQUES FOR IDENTIFICATION DOCUMENTS

RELATED APPLICATION DATA

The present application is a continuation in part of U.S. patent application Ser. No. 09/939,298, filed Aug. 24, 2001 (now U.S. Pat. No. 6,804,379), which is a continuation of Ser. No. 09/127,502, filed Jul. 31, 1998 (now U.S. Pat. No. 6,345,104). Each of the above-mentioned patent documents is herein incorporated by reference.

FIELD OF THE INVENTION

The present invention provides methods and features for authenticating identification documents and banknotes.

BACKGROUND AND SUMMARY OF THE INVENTION

In parent application Ser. No. 09/127,502 we disclose the following: Many security documents are still designed largely by hand. A designer works at a drafting table or computer workstation, and spends many hours laying-out minute (e.g. 5 mm×5 mm) excerpts of the design. To aid integration of watermark and/or calibration pattern data in this process, an accessory layout grid can be provided, identifying the watermark "bias" (e.g. −3 to +3) that is to be included in each 250 micron cell of the security document. If the accessory grid indicates that the luminance should be slightly increased in a cell (e.g. 1%), the designer can take this bias in mind when defining the composition of the cell and include a touch less ink than might otherwise be included. Similarly, if the accessory grid indicates that the luminance should be somewhat strongly increased in a cell (e.g. 5%), the designer can again bear this in mind and try to include more ink than might otherwise be included. Due to the substantial redundancy of most watermark encoding techniques, strict compliance by the designer to these guidelines is not required. Even loose compliance can result in artwork that requires little, if any, further modification to reliably convey watermark and/or calibration information.

Such "designing-in" of embedded information in security documents is facilitated by the number of arbitrary design choices made by security document designers. A few examples from U.S. banknotes include the curls in the presidents' hair, the drape of clothing, the clouds in the skies, the shrubbery in the landscaping, the bricks in the pyramid, the fill patterns in the lettering, and the great number of arbitrary guilloche patterns and other fanciful designs, etc. All include curves, folds, wrinkles, shadow effects, etc., about which the designer has wide discretion in selecting local luminance, etc. Instead of making such choices arbitrarily, the designer can make these choices deliberately so as to serve an informational—as well as an aesthetic—function.

To further aid the security document designer, data defining several different information-carrying patterns (both watermark and/or calibration pattern) can be stored on mass storage of a computer workstation and serve as a library of design elements for future designs. The same user-interface techniques that are employed to pick colors in image-editing software (e.g. Adobe Photoshop) and fill textures in presentation programs (e.g. Microsoft PowerPoint) can similarly be used to present a palette of information patterns to a security document designer. Clicking on a visual representation of the desired pattern makes the pattern available for inclusion in a security document being designed (e.g. filling a desired area).

In the embodiment earlier-described, the calibration pattern is printed as a visible artistic element of the security document. However, the same calibration effect can be provided subliminally if desired. That is, instead of generating artwork mimicking the gray-scale pattern of the reference calibration block, the reference calibration block can itself be encoded into the security document as small changes in local luminance. In many such embodiments, the bias to localized document luminance due to the calibration pattern is simply added to the bias due to the watermark data, and encoded like the watermark data (e.g. as localized changes to the width or position of component line-art lines, as inserted ink droplets, etc.).

The present invention continues and improves these inventive ideas. According to one aspect of the present invention, an identification document includes a security enhancer (e.g., perhaps hidden in line art, artwork or graphic designs). The security enhancer includes a grouping of concentric circles. The concentric circles share a common center, and each circle is equally spaced from one another by a spacing distance d. Personal information carried by the identification document (e.g., driver's license number, birth date, photograph, biometric information, name or address, etc., etc.) is reduced by a hash algorithm. The result of the hash algorithm is a number. The number forms the spacing distance d for the grouping of concentric circles—personalizing the security enhancer to the cardholder. The identification document is printed to include the customized security enhancer.

The repetitive spacing distance d of the plurality of concentric circles in a spatial domain has an identifiable frequency response in a frequency domain. In particular, the corresponding frequency domain response includes a circle with a radius that is indirectly related to the spacing distance d. The frequency domain response (or frequency domain radius) can be evaluated to determine a counterfeit or forgery.

Banknotes, security documents, deeds, legal instruments, etc. can be similarly marked.

Other aspect of the invention utilizes a security enhancer for document identification or classification. A security enhancer's frequency characteristics are compared against expected characteristics to identify or classify the document.

Additional features and advantages of the present invention will become more apparent with reference to the following detailed description and accompanying drawings.

DETAILED DESCRIPTION

The presently preferred embodiments are described with respect to an identification (ID) document. An identification document may include, e.g., a passport, identification paper, driver's license, identification card, company identification badge, secure area or network access badge or card, etc., etc. We note, however, that the present invention is not so limited. Indeed, our inventive techniques can be similarly applied to bank notes, security documents, legal instruments, visas, product packaging and labels, advertisements, badges, papers and printed matter, etc., etc.

Figure 1:
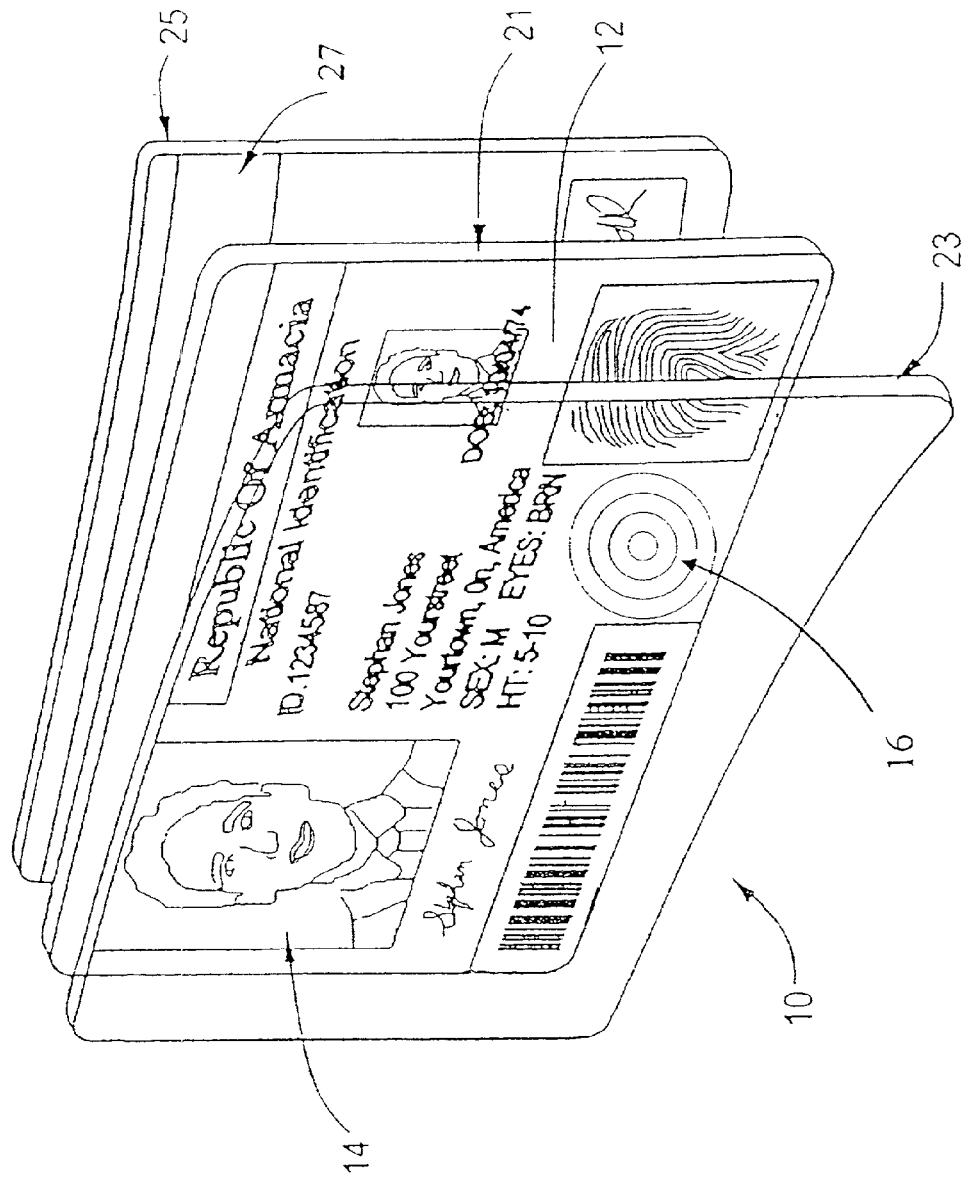
FIG. 1 shows an identification document including a security enhancer.

With reference to FIG. 1, an ID document 10 may include a "card-shaped" substrate 21, historically made from a material such as paper or plastic, and even synthetics such as Teslin®. (Teslin® is available from PPG Industries, One PPG Place, Pittsburgh, Pa. 15272 U.S.A). ID document 10 will typically include a photograph 14 and various data 12, e.g., such as textual information, graphics, a screened-back or hidden image, bar codes, biometric information (e.g., a fingerprint), personal information (e.g., name, address, birth date, ID number, etc.), or the like. Of course both sides of substrate 21 can receive printing.

The printed substrate 21 is usually laminated. The laminate typically includes a polyester or polycarbonate-based top sheet 23 and bottom sheet 25 that respectively overlay the top and bottom of the substrate 21. Heat and/or adhesives and pressure are used to bond the laminate sheets 23 and 25 with the substrate 21. Or a laminate can include a pouch into which the substrate 21 slips. Again, heat and/or adhesives and pressure are used to bond the substrate 21 with a pouch laminate. The laminates provide a protective covering for the printed substrate and provide a level of protection against unauthorized tampering. (For example, a laminate would have to be removed to alter the printed information and then subsequently replaced after the alteration.). A laminate layer 23 or 25 may optionally carry information like a card bearer's signature or security features.

In some implementations, information may also be optically or magnetically stored on recording media (e.g., magnetic stripe 27) carried by the laminate 25. Of course the magnetic stripe 27 can be alternatively carried by substrate 21 or laminate 23.

We note that the present invention encompasses ID documents including more or less features and layers than are illustrated in FIG. 1.

ID document 10 includes a security enhancer 16. The security enhancer 16 can be printed (or laser engraved) on the substrate 21 or a laminate 23 or 25. Security enhancer 16 provides an indicator to help determine the authenticity of ID document 10. In one implementation, the indicator provides a frequency domain indication. In another implementation, the indicator provides a spatial domain indication. And in yet another implementation, the indicator provides both a frequency domain indication and a spatial domain indication.

Figure 2:
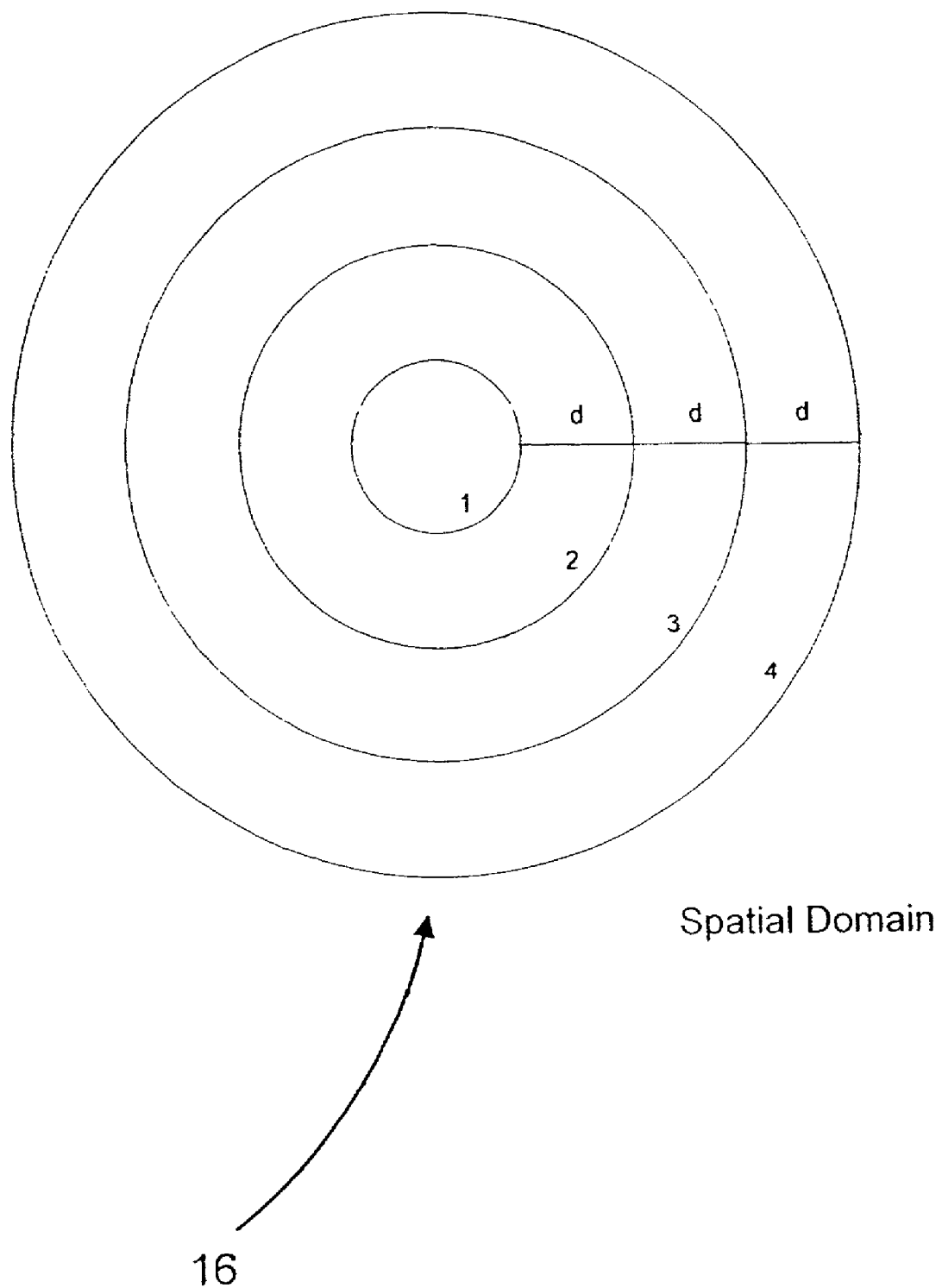
FIG. 2 is an enlarged view of the FIG. 1 security enhancer.
Figure 3:
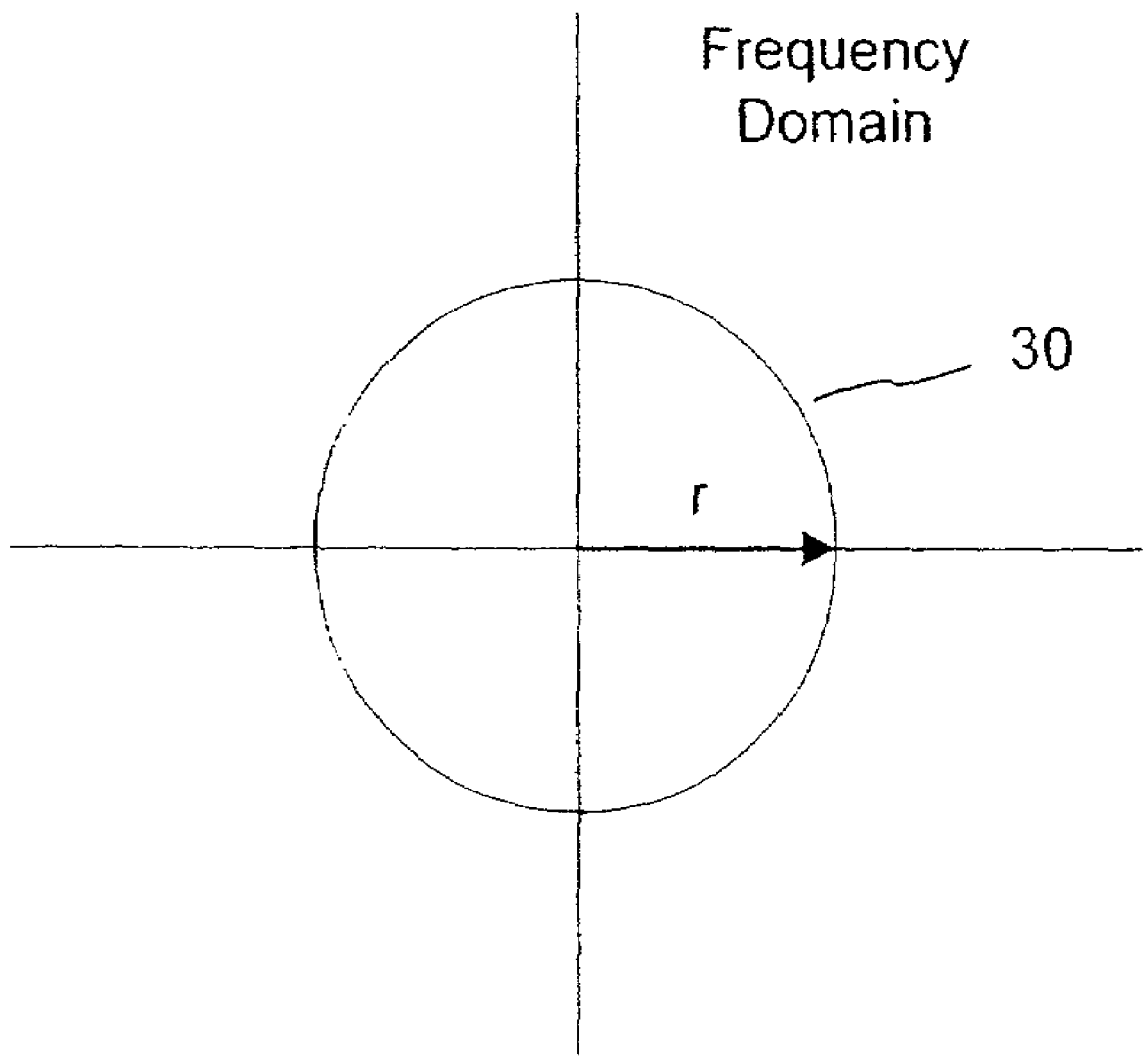
FIG. 3 is a graphical representation of a frequency domain response of the FIG. 2 security enhancer.

With reference to FIGS. 1 and 2 the illustrated security enhancer 16 includes a grouping of concentric circles 1, 2, 3 and 4. (We note that the illustrated security enhancer 16 has been exaggerated to simplify this disclosure. Security enhancer 16 will typically be incorporated in a background pattern, line art, graphic or artwork design. Security enhancer 16 will oftentimes be relatively smaller than photograph 14 and data 12. In other case, the security enhancer will be relatively larger, e.g., when placed in a background pattern.). The circles are evenly spaced with respect to one another. For example, the distance between the edge of circle 1 and the edge of circle 2 is d; the distance between the edge of circle 2 and the edge of circle 3 is d; and a distance between the edge of circle 3 and the edge of circle 4 is also d. This consistent spacing yields an identifiable frequency when examined in the frequency domain (e.g., Fourier domain). The FIG. 2 security enhancer's frequency response includes a circular pattern 30 as shown in FIG. 3.

The circle spacing distance d (FIG. 2) and the frequency domain, circular radius r (FIG. 3) are inversely related. The relationship can be expressed as:

$$d = k \cdot TRS/r, \qquad \text{Equation 1}$$

where k is a constant, and TRS is a transform sampling size factor (e.g., Fast Fourier transform sample size, discrete cosine transform sample size, relative sample size, etc.). The transform sampling size factor TRS helps compensate for differences in sample size (e.g., 64 points vs. 128 points, etc.), if needed. We note that in many situations TRS will be replaced by 1, e.g., when a base sampling size is employed. The distance r may be measured from the DC frequency component (located at the graphical origin in FIG. 3) to the circle 30. We note that the constant k is preferably 1 when scanning an image at a resolution equal to the original printing resolution, e.g., scanning a 100 dpi image at 100 dpi. The constant k can be adjusted to compensate for differences in scanning resolution and printing resolution. For example, when scanning a 100 dpi printed image at 300 dpi the frequency domain response shrinks by ⅓. The constant can be set to 3 to offset the shrinking. Or when scanning a 100 dpi printed image at 50 dpi, the frequency response is doubled. The constant can be set to ½ to compensate.

Figure 4A:
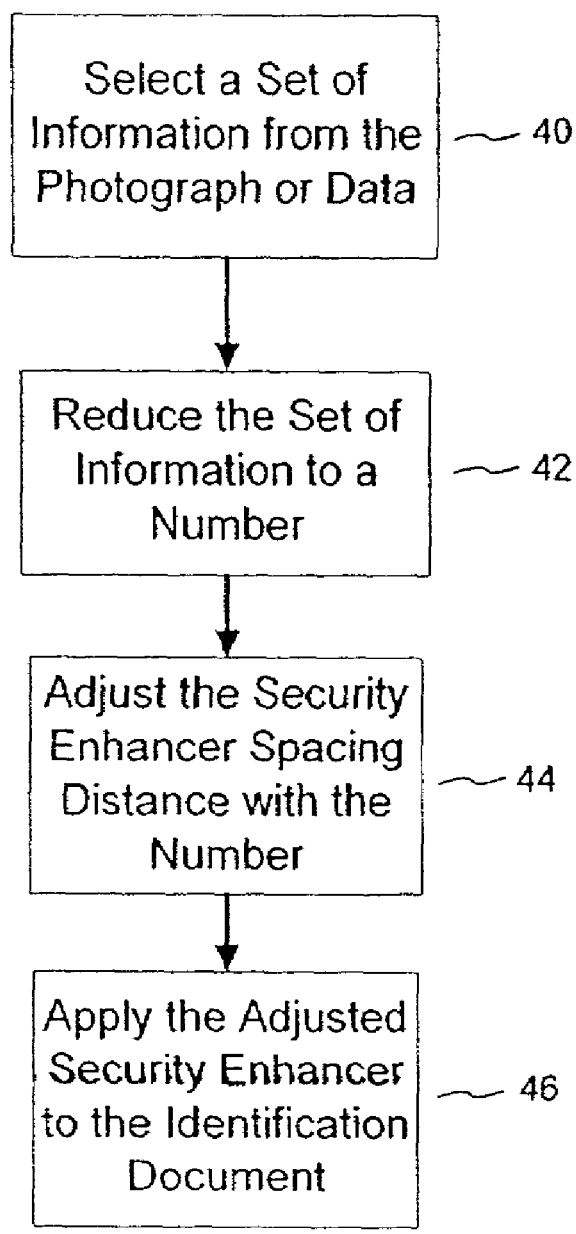
FIGS. 4a and 4b respectively illustrate a technique for providing a security enhancer, and a technique for verifying the authenticity of a document including a security enhancer.

We use the circle spacing d and/or the circular radius r to provide increased security for ID document 10. With reference to FIG. 4a, we select a set of information from the photograph 14 and/or data 12 (step 40). The selected set of information is preferably unique to the cardholder or otherwise represents personal information. For example, we may select the date of birth as the set of information. Or we select the biometric fingerprint, photograph, photograph subset, or name and address, etc. We reduce the selected set of information to obtain a number (step 42). For example, we reduce the selected set of information with a hashing algorithm. (Most generally, a hashing algorithm converts the set of information into a lower number of bits or directly to a number. For example, an ASCII text string may be converted into a number or lower number of bits. Or a photograph or biometric fingerprint may be similarly reduced to produce a number. Conventional hashing algorithms include MD4, MD5 or SHS-1, etc.).

The result of the hashing algorithm preferably produces a number. (Or the output of the hashing algorithm is used to generate a number.). This number is used to set or adjust the spacing distance d (FIG. 2) for the security enhancer 16 (step 44). In another implementation, the number is used to offset a predetermined spacing distance to achieve a personalized spacing distance d. The security enhancer 16 is printed or applied to the document 10 after the distance d is adjusted (step 46). Hence, personalized ID document information (e.g., photograph, birth date and/or name, etc.) is used to customize the security enhancer 16 by setting a spacing distance d.

Figure 4B:
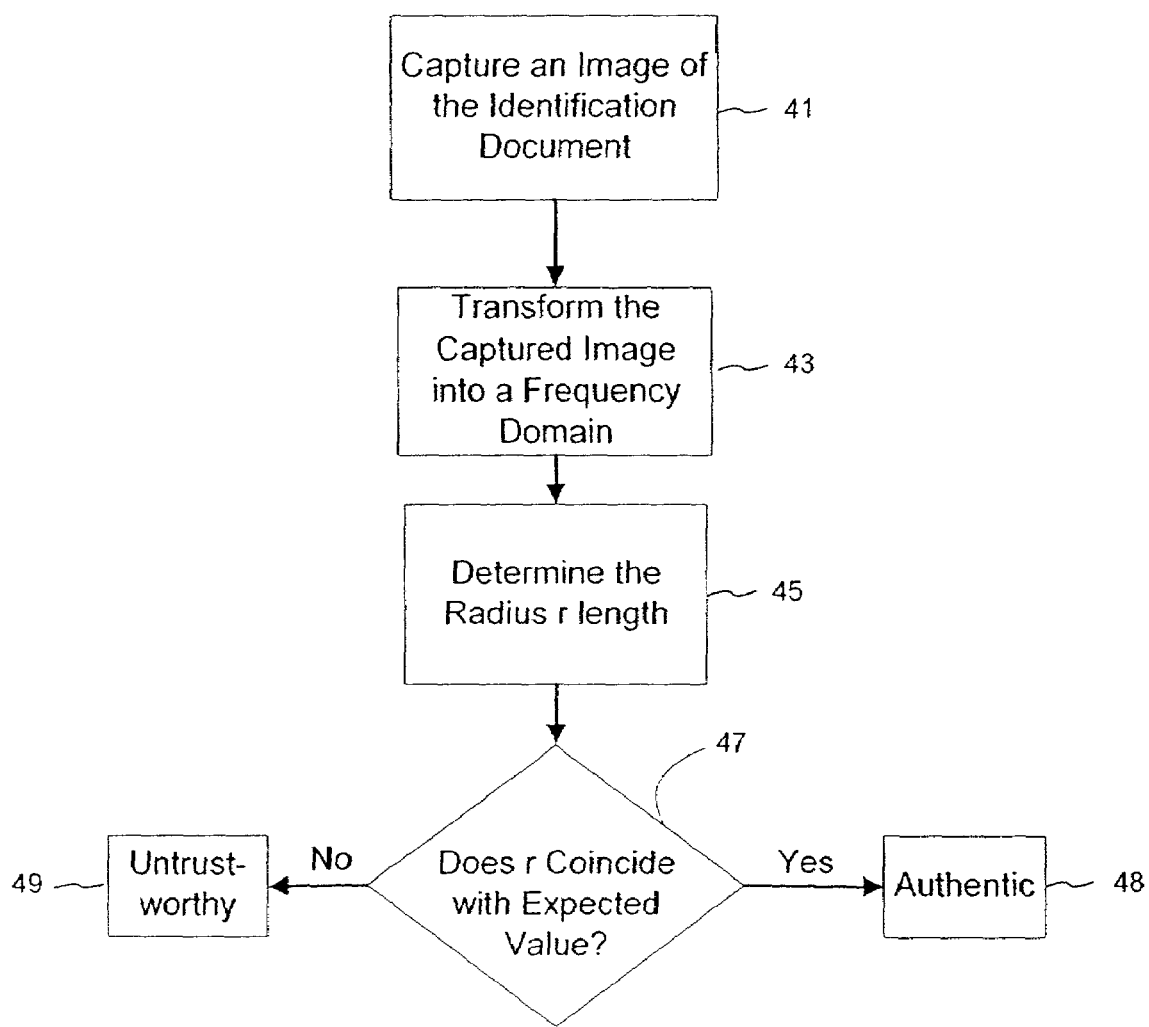

An authentication method for a document including a security enhancer is discussed with reference to FIG. 4b. An image of ID document 10 is scanned or otherwise captured (step 41). For example a digital camera, PC web camera or scanner captures an image of ID document 10. The camera communicates the captured image to a computer or processing circuitry that is executing software instructions. The software instructions transform the captured image into a frequency domain, e.g., a Fourier Transform Domain (step 43). The equal spacing of the concentric circles in the spatial domain produces a frequency response in the frequency domain, namely, the response is a circle having a radius r. The radius r is determined or measured, e.g., in the frequency domain or from a logarithmic transform of the frequency domain (step 45).

The radius r is compared to an expected value r or range of values r (step 47). In one implementation, we select the same set of information that was used to originally seed the hash algorithm for setting the circle spacing distance d in ID document 10. The hash algorithm hashes the selected set of information to produce a number d. The number d and the determined radius r are compared via Equation 1, with the constant k and TRS being adjusted, if needed, to account for printing and image capture dpi and sample size. If d and k·TRS/r coincide the ID document is considered authentic (step 48). Otherwise the document is considered untrustworthy (step 49).

In another implementation, we calculate d with the hash algorithm, and then calculate an expected radius r value with Equation 1. We compare the expected r value with the measured or determined r value. If the expected r value and the measured r value are equal (or fall within an acceptable tolerance range) the ID document 10 is considered authentic. Otherwise the ID document 10 is considered untrustworthy.

In still another implementation, after obtaining the measured or determined radius r, we calculate a value d with Equation 1. We determine an expected value for d using the corresponding hashing algorithm. If the expected d value and the calculated d value are equal (or fall within an acceptable tolerance range) the ID document 10 is considered authentic. Otherwise the ID document 10 is considered untrustworthy.

In some implementations our security enhancer includes both a spatial component (e.g., the circle spacing d) and a frequency component (e.g., the frequency circle radius r). The authenticity of a document can be verified by a relationship between the spatial component and the frequency component.

In other implementations we verify authenticity of a document by examining only one of these components. For example, we focus on the spatial domain component. We use pattern recognition and/or line or edge detection techniques to identify the spacing distance d. An image of ID document 10 is captured. The captured image is analyzed with pattern or line detection techniques (software) to discern the pattern associated with the security enhancer. Edge or line detectors, e.g., Hough and/or Radon transforms or generalized versions of such, are employed to discern a spacing distance d between elements of the security feature. The discerned spacing distance d is compared with an expected spacing distance d to determine whether the ID document is authentic.

In another implementation, we focus on the frequency domain component. The frequency response may correspond to a graphic or artwork element that is inherently used in the subject document. We use the frequency response of the security enhancer to identify a type of document. If a frequency response is found to have a first radius (or shape/location/characteristic), or otherwise falls within a predetermined range of radii, the corresponding document is determined to be an ID document. Or if the frequency response is found to have a second radius (or shape/location/ characteristic), or otherwise falls within a predetermined range of radii, the corresponding document is determined to be a banknote, etc. Once a document is identified, a copy deterrent system can decide whether to allow printing of the document. For example, if a document is determined, based on its frequency characteristics, to be a bank note or identification document, the copy deterrent system stymies a copy operation.

Our authentication methods are helpful in preventing forgers. For example, suppose an identification document includes a security enhancer. The identification document belongs to say 16-year old Joan. The identification card further includes Joan's photograph and printed information evidencing Joan's personal information (e.g., name, sex, age and address, etc.). Joan decides that she wants to "up-grade" her age, by cutting and pasting her identification card photograph onto her 22-year old sister, Molly's, identification card. Molly's identification card also includes a security enhancer and Molly's personal information (e.g., name, sex, age and address, etc.).

Joan pulls off a professional job replacing Molly's photograph with her own. All seems fine for Joan until an authentication process is used to verify the identification document. A hash of Joan's photograph is used as an expected value d for the spacing distance of the security enhancer. The expected d value, however, does not match the actual value d, since the actual value d was determined from a hash of Molly's photograph, and not Joan's. (Or a frequency domain characteristic corresponding to Molly's security enhancer, like a radius r, is measured and compared with a calculated value or to a calculated spacing distance d.). The counterfeit is justly determined.

In an alternative embodiment, ID document 10 includes a digital watermark. Digital watermarking is a process for modifying physical or electronic media to embed a machine-readable code into the media. The media may be modified such that the embedded code is imperceptible or nearly imperceptible to the user, yet may be detected through an automated detection process.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark.

Several particular digital watermarking techniques have been developed. The reader is presumed to be familiar with the literature in this field. Particular techniques for embedding and detecting imperceptible watermarks in media signals are detailed in the assignee's co-pending U.S. patent application Ser. No. 09/503,881 (now U.S. patent No. 6,614, 914) and U.S. patent application Ser. No. 6,122,403, which are each herein incorporated by reference.

Returning to the alternative embodiment, a digital watermark embedded in ID document 10 carries a payload or plural-bit data (e.g., a key). The key reveals which set of information is used to seed the hash algorithm. The key can include the set of information itself (e.g., by carrying the birth date or document number) or can include a numeric indicator (e.g., 101 implies the birth date, while 110 implies the document number, etc.). Still further, the key may include a database pointer which can be used to point to a database record. The database record reveals which set of information was used to seed the hash algorithm. In a related implementation, instead of using a digital watermark to carry such information, the document itself may provide the clues. For example, the third number of an ID document number may signal which set of information was used to seed the hash algorithm. Or barcode information and/or a magnetic stripe can provide the key. In a related implementation, we encrypt the digital watermark payload, barcode or data carried by the magnetic stripe to provide additional security.

To verify authenticity in this alternative embodiment, the digital watermark (or other indicator) is decoded to retrieve the key. The key identifies the set of information. The set of information is collected and used to seed the hash algorithm. The hash algorithm produces a number, which if the document is authentic, should correspond to the spacing distance d and/or to the frequency domain radius r.

Figure 5A:
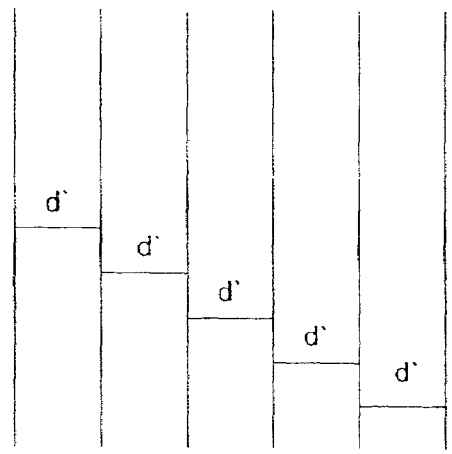
FIGS. 5a and 5b illustrate parallel line-based security enhancers.
Figure 6A:
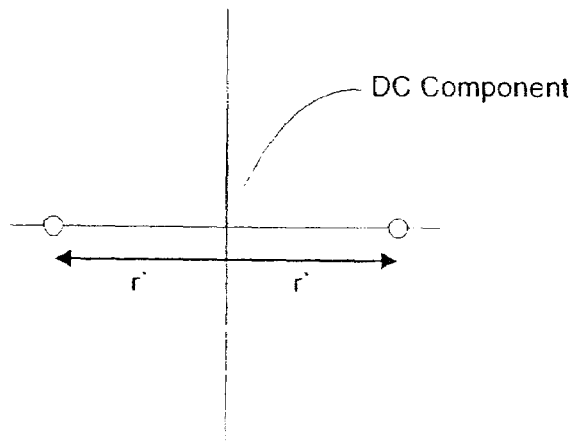
FIGS. 6a and 6b illustrate frequency responses for the FIGS. 5a and 5b security enhancers, respectively.

Up to this point in the disclosure we have focused on a security enhancer 16 that includes a grouping of concentric circles. We note that the present invention is not so limited. Indeed, the present invention encompasses other security enhancers having characteristics that yield identifiable spatial domain and frequency responses. For example, consider the security enhancers illustrated with respect to FIGS. 5a and 5b. In FIG. 5a the security enhancer includes a plurality of parallel lines. The parallel lines are spaced equally at a distance d'. The frequency of spacing between the parallel lines in the spatial domain results in a peak or magnitude point in the frequency domain. With reference to FIG. 6a, a frequency point is location at a distance r' from the DC component. (Of course we recognize that a transform, e.g., the Fourier transform, will include symmetric points corresponding to the peak. Accordingly, we have illustrated two frequency points in FIG. 6a.). The distance r' is related to the spacing distance d' by the following equation:

$$d' = k \cdot TRS/r', \quad \text{Equation 2}$$

where k is a constant and TRS is a transform sampling size factor as discussed above with respect to Equation 1.

Figure 5B:
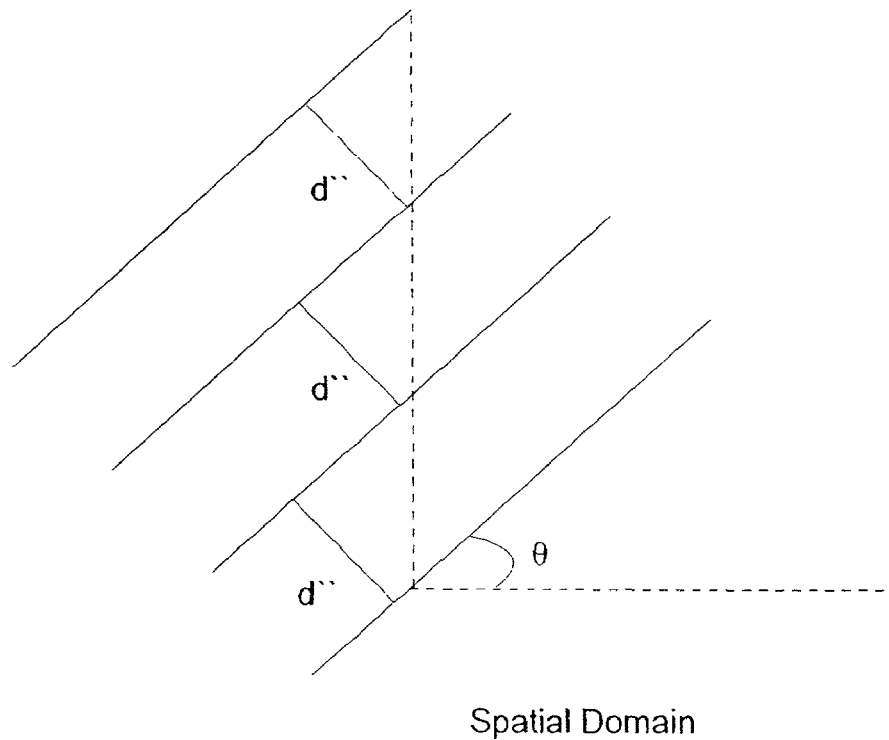
Figure 6B:
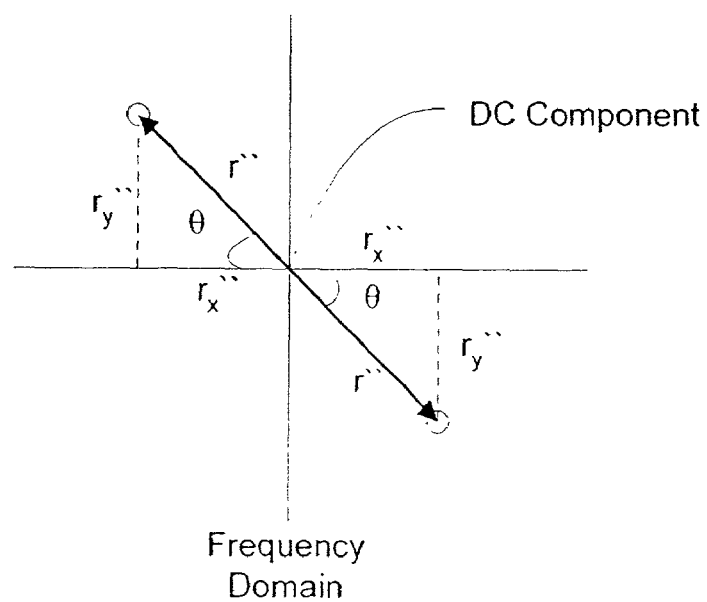

Another alternative security enhancer is shown in FIG. 5b. In the spatial domain, the security feature includes a plurality of parallel lines, spaced apart from one another by a distance d", and positioned at an angle θ with respect to an XY axis (dashed lines) as shown. In the frequency domain, with reference to FIG. 6a, the security enhancer includes a point that is offset from the horizontal axis by the angle θ at a distance r". The relationship between d" and r" is expressed as:

$$d'' = k \cdot TRS/r'', \quad \text{Equation 3}$$

where k is a constant, TRS is a transform sampling size factor, as discussed above with respect to Equation 1, and $r_x'' = \cos\theta$, and $r_y'' = \sin\theta$.

We note that other security designs (such as parallel—but squiggly—lines, spaced evenly apart, concentric half-circles, evenly spaced arcs, parallel lines formed by concentric triangle, squares, octagons, etc., etc.) will yield identifiable frequency responses. These other security designs can be suitable interchanged with the present invention, particularly if the design characteristics can be adjusted to accommodate personal information or predetermined security features. We note that while these other designs may be used as security enhancers, they may have a plurality of frequency responses which may need to be sorted to identify the authenticating frequency clue.

A library of security enhancers can be made available to a designer or ID document issuer. The library may include graphics or digital representations of the group of concentric circles, squiggly lines, parallel lines, etc. In the case of an ID document, after capturing a photograph or personal information related to the cardholder, a hash algorithm reduces a set of captured photograph or personal information to a spacing distance d. The library (or a cooperating software module) uses the spacing d to adjust a selected security enhancer. The selected security enhancer is thus personalized to the cardholder. (We note that in the case of an ID document issuer, like a state DMV, the selection of a security enhancer will typically be standardized. Hence, each ID document may include the same basic security enhancer, but each security enhancer will be personalized via the individualized spacing distance.).

One alternative frequency-circle radius calculation (or determination) technique converts a Cartesian circle representation (e.g., FIG. 3) into a polar coordinate representation. A horizontal component of collected peak values is determined and used as the radius value, or used to determine the radius value.

Detection in Noisy Environments

Figure 7:
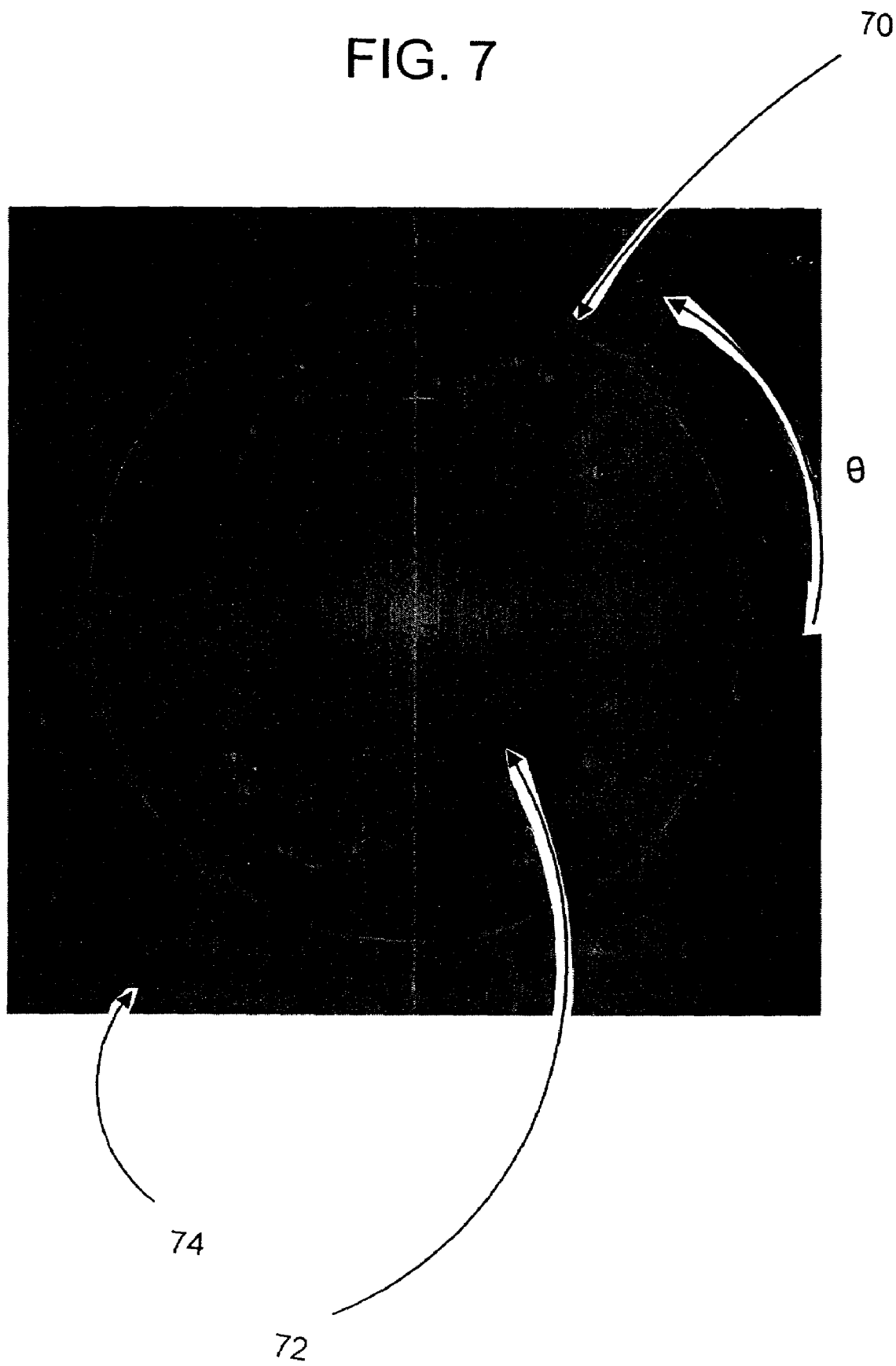
FIG. 7 illustrates a noisy frequency domain space corresponding to a security enhancer including concentric circles.
Figure 8:
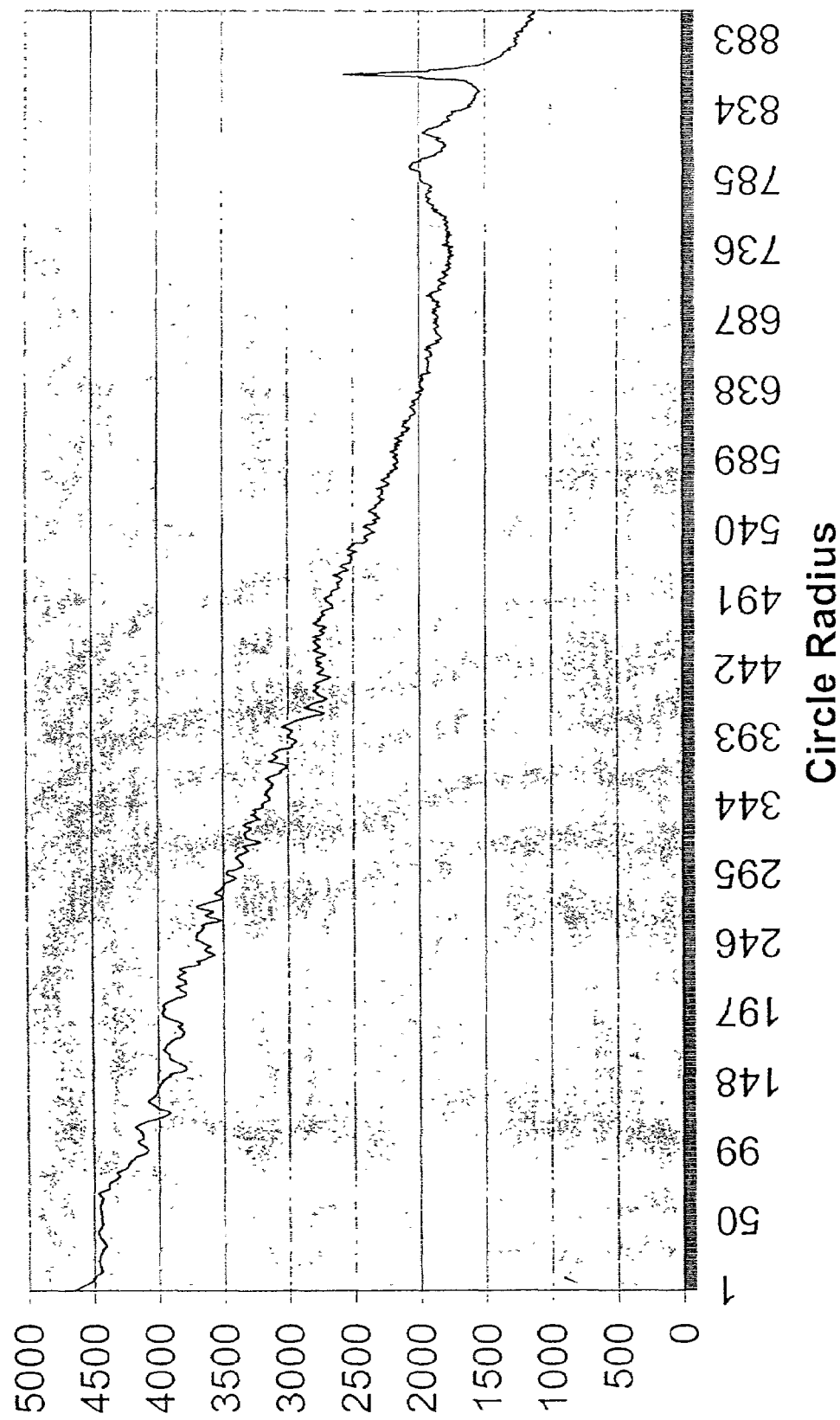
FIGS. 8 and 9 graphically illustrate the frequency space shown in FIG. 8 in terms of circle radius and peak magnitude.
Figure 9:
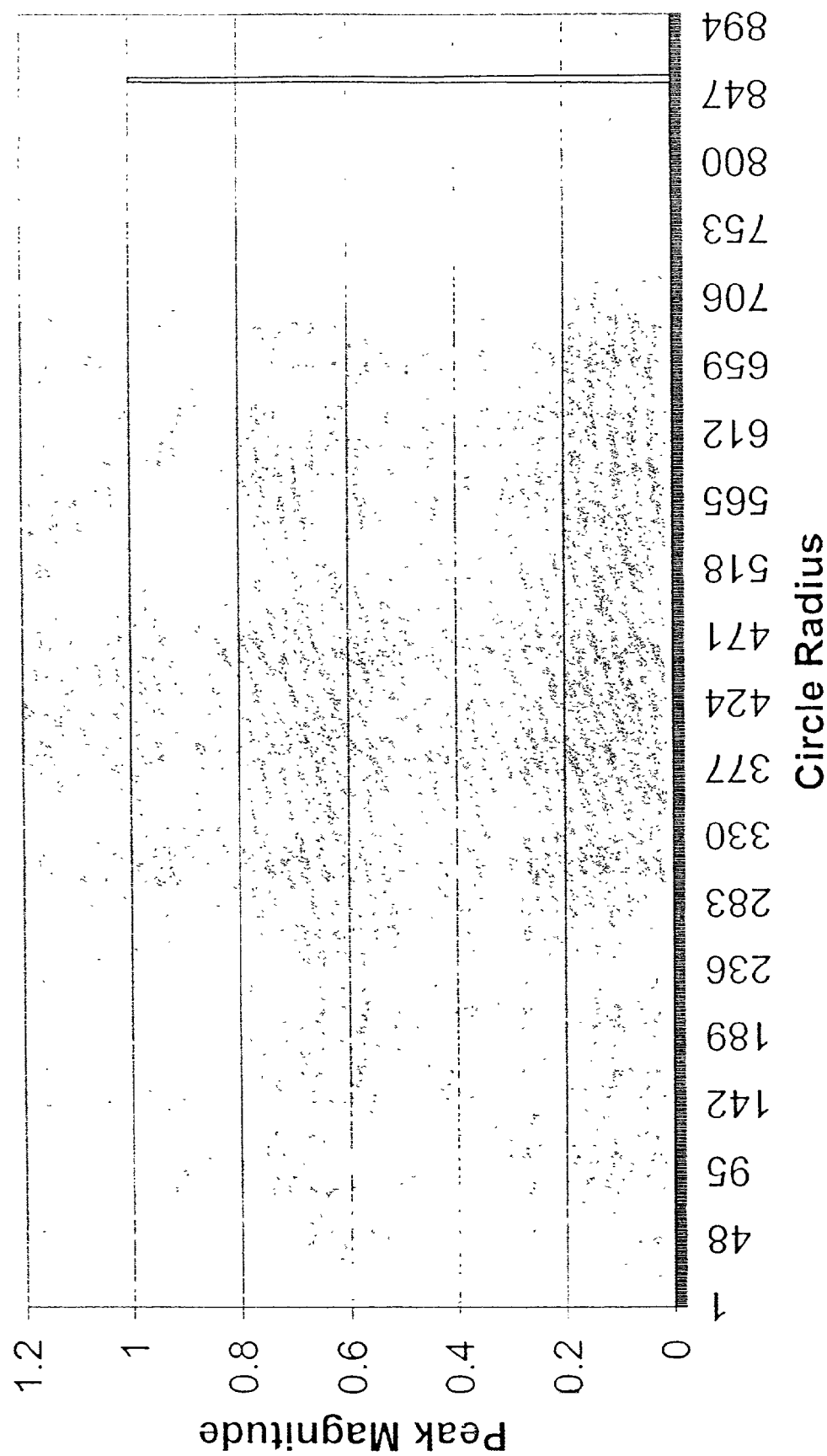

Now consider the frequency domain (i.e., Fourier Domain) space shown in FIG. 7. The circular frequency response 70 corresponds to a grouping of concentric circles in the spatial domain. The frequency space is noisy. The FIG. 7 frequency space includes many other frequency characteristics 72 (e.g., corresponding to a design including semi-circles) and frequency points 74. In such a noisy environment, frequency magnitudes can be measured (or graphically collected) as in FIG. 8. Applying a log polar transform to FIG. 7, and then averaging along an axis θ, produced the FIG. 8 graph. The circle 70 radius length corresponds to the spike or peak between the 834 and 883 radius markers. If the radius peak is noisy, as is the case with the peak between the 834 and 883 radius markers, we can detect the radius by comparing a suspected peak to the local average of its neighboring values. For example, we can take an average of the peaks between 834 and 883, excluding the suspected peak itself, and then compare the suspected peak to the average. In this example implementation, if the local peak average is m, and the standard deviation of the local peaks values is σ, then the thresholds, T1 and T2, can be used to narrow in on the circle's 70 actual radius. Lets suppose that T1=m−α·σ, and T2=m+α·σ, where α is a constant determined, e.g., empirically for a given security enhancer. Then, if T1<suspected peak value<T2, the suspected peak value is ignored, otherwise the suspected peak value is recorded. FIG. 9 shows the result of the above process when applied to the data represented by FIG. 8. The peak just beyond the 847 marker comprises the circle 70's radius r.

Alternative Applications

An alternative application of our present invention is a copy detection mechanism. We can minimize the circle spacing d (e.g., FIG. 2) of a security enhancer such that copying (e.g., scanning and printing) will blur or blend adjacent circle edges. The copy will appear more like one circle instead of a group of concentric circles. Hence, while the original security enhancer will include a frequency response having a circle r, a copy will not. The copy is confirmed when the expected frequency response is not determined.

Another inventive alternative application uniquely assigns a spacing distance d per user or printer location. The security enhancer automatically defaults to a particular spacing depending on who is handling a document. Say for example, that John has a copy of a classified document. John prints the document. Prior to printing, a security application (perhaps a plug-in or operating system module) applies a security enhancer to the print. The security enhancer includes a spacing that is uniquely assigned to John. Then, if the printed document is found in an unexpected channel, the spacing can be analyzed to determine who printed, and therefore leaked, the document. The security enhancer can be similarly modified to reflect a certain printer or intended receiver of the document.

Conclusion

The foregoing are just exemplary implementations of the present invention. It will be recognized that there are a great number of variations on these basic themes. The foregoing illustrates but a few applications of the detailed technology. There are many others.

For example, the security feature illustrated in FIGS. 1, 2, 5a and 5b can include more or less circles or lines. Of course, the strength of the frequency response will increase as the number of circles or lines increases. We also note that while the present invention has been described by seeding a hash algorithm with personal information to set a security enhancer spacing distance d, the hash algorithm output could alternatively be used to set the expected value of the frequency domain response r, which can be mathematically manipulated to achieve a spatial domain spacing distance d. Moreover, while we have outlined specific relationships between d and r, the present invention is intended to encompass other relationships between a security enhancer's spatial and frequency domain characteristics. These relationships can be used with our security enhancer.

We note that our inventive techniques can be expanded to video. A video frame may include a security enhancer (e.g., subliminally placed, or as background). The spacing may be set by reference to a video distributor, target recipient, or studio, etc. The security feature may also be applied to rough cuts as a marking tool and to prevent unauthorized distribution. The security enhancer can be visible in such situations.

To provide a comprehensive disclosure without unduly lengthening this specification, applicants incorporate by reference, in their entireties, the disclosures of the above-cited patents and applications, along with U.S. patent application Ser. No. 10/027,783, filed Dec. 19, 2001 (published as US 2002-0126872 A1). The particular combinations of elements and features in the above-detailed embodiments are exemplary only; the interchanging and substitution of these teachings with other teachings in this application and the incorporated-by-reference patents/applications are also contemplated.

Although not belabored herein, artisans will understand that the systems and methods described above can be implemented using a variety of hardware and software systems. Alternatively, dedicated hardware, or programmable logic circuits, can be employed for such operations.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method of enhancing security of an identification document comprising:
   providing information to be printing on a surface of the identification document;
   selecting a set of information from the provided information;
   hashing the selected set of information to yield a first number; and
   adjusting a design feature of a design according to the first number, the design feature to be printed on a surface of the identification document.

2. The method of claim 1 wherein in the spatial domain the design comprises a group of concentric circles and the design feature comprises a spacing distance between adjacent circles.

3. The method of claim 2 wherein in a frequency domain the group of concentric circles yields a frequency response including a circle having a radius corresponding to the spacing distance.

4. The method of claim 3 wherein the provided information comprises at least one of a photograph and information corresponding to a holder of the identification document, and wherein adjusting the design feature according to the first number personalizes the design feature to the holder of the identification document.

5. The method of claim 3 wherein the group of concentric circles comprise a group of concentric semi-circles.

6. The method of claim 1 further comprising, prior to said adjusting, selecting the design from a library including a plurality of designs.

7. The method of claim 1 wherein in the spatial domain the design comprises parallel lines and the design feature comprises a spacing distance between adjacent lines.

8. The method of claim 7 wherein in a frequency domain the parallel lines yield a frequency response including a magnitude peak having a horizontal distance from a DC component that corresponds to the spacing distance.

9. The method of claim 1 further comprising embedding a digital watermark in the identification document, the digital watermark including a key to reveal which set of information was selected from the provided information.

10. The method of claim 9 wherein the key is encrypted prior to embedding.

11. The method of claim 1, further comprising encoding a bar code or magnetic stripe with a key, the key indicating which set of information was selected from the provided information.

12. A method of providing a physical object comprising:
   receiving information;
   selecting a set of information from the information;
   hashing or reducing the selected set of information to yield a first number; and
   adjusting a design feature according to the first number, the design feature to be provided on a surface of the physical object.

13. The method of claim 12 further comprising: prior to said adjust, selecting the design feature from a library including a plurality of designs features.

14. The method of claim 12 wherein the physical object comprises at least an identification document.

15. The method of claim 14 wherein the information comprises at least one of: i) a photograph, and ii) information corresponding to a bearer of the identification document, and wherein adjusting the design feature according to the first number personalizes the design feature to the bearer of the identification document.

16. A method of providing a physical object comprising:
receiving data;
accessing a library including a plurality of graphic designs, wherein each of the graphic designs includes information steganographically embedded therein;
selecting at least one graphic design from the library based on the data; and
provided the selected graphic design on a surface of the physical object.

17. The method of claim 16, wherein the data comprises a hash or reduced-bit representation of larger information, said method further comprising adjusting the selected design according to the data.

* * * * *